United States Patent [19]

Phillips, II

[11] Patent Number: 4,875,815
[45] Date of Patent: Oct. 24, 1989

[54] BLIND FASTENER

[75] Inventor: Ronald W. Phillips, II, Mogadore, Ohio

[73] Assignee: The B. F. Goodrich Company, Akron, Ohio

[21] Appl. No.: 169,532

[22] Filed: Mar. 17, 1988

[51] Int. Cl.⁴ ........................ F16B 13/04; F16B 13/06
[52] U.S. Cl. ...................................... 411/38; 411/55; 411/183
[58] Field of Search .................... 411/34–38, 411/55, 57, 60, 54, 173, 183

[56] References Cited

U.S. PATENT DOCUMENTS

| | | |
|---|---|---|
| 2,384,347 | 9/1945 | Schutz .................................. 411/38 |
| 2,409,352 | 10/1946 | Gill ....................................... 411/38 |
| 2,763,314 | 9/1956 | Gill . |
| 3,030,705 | 4/1962 | Gill . |
| 3,789,728 | 2/1974 | Shackelford . |
| 4,007,659 | 2/1977 | Stencel ................................. 411/34 |
| 4,036,098 | 7/1977 | Schruff ................................. 411/34 |
| 4,237,768 | 12/1980 | Volkmann ............................. 411/54 |

FOREIGN PATENT DOCUMENTS 2290600  6/1976  France ................................ 411/38

Primary Examiner—Neill R. Wilson
Attorney, Agent, or Firm—Joseph Januszkiewicz

[57] ABSTRACT

A blind fastener that is installed from one side only of a hole in a plate structure wherein the blind fastener has a tubular body with a head portion and a sleeve journaled in the tubular body. The tubular body has a plurality of slits that extend longitudinally therealong to facilitate an upsetting or a buckling action wherein the fastener is secured to the plate structure between the buckled portion of the tubular body and the head. The sleeve has a threaded upper portion and flanged end portion that abuttingly engages the tubular body to effect the buckling force thereon. The sleeve is connected to the tubular body to ensure a fluid tight fit.

4 Claims, 3 Drawing Sheets

4,875,815

BLIND FASTENER

BACKGROUND

This invention relates to blind fasteners of the type that can be installed entirely from one side of a structure and more particularly to a blind fastener that is liquid tight on installation even though the screw attached thereto is removed. Conventional blind fasteners have an internal screw thread that facilitates the upsetting action of a body portion to firmly secure such fastener to a plate structure or member which screw threads are also used to fasten a separate component of a product to such plate structure by means of a removable screw. Such blind fasteners are used in those cases where it is not convenient nor practical to drill and tap the plate structure to receive a screw.

The blind fasteners heretofore used consisted of various designs wherein fastener had a tubular or cylindrical body with a head on an upper portion that was slotted and a lower body portion that was threaded. In the process of securing such fasteners to the plate structure, the upper slotted body portion would be deformed or folded outwardly thereby presenting a flanged and deformed portion which would secure the fastener to the plate structure with the head on one side and the deformed flanged portion on the other side. In this deformation process of the tubular body, the slotted portion would provide openings in the upper tubular body portion which would permit the passage of fluid from one side of the plate structure to the other side. In addition the central threaded bore of the fastener would also provide for the passage of fluids upon its removal. The present invention provides a movable sleeve that cooperates with the tubular body to seal the blind fastener from the passage of fluids in all instances of use.

SUMMARY OF THE INVENTION

This invention in its preferred embodiment is an integral blind fastener which can be installed from one side only of a hole in a structure or plate member and can be expanded to grip the blind side surface of the plate member in a liquid tight seal with respect to the fastener and the plate member. The fastener has a head attached to one end and has extending therefrom a tubular body portion with a plurality of longitudinal slits along its body portion to facilitate an upsetting action to such tubular body. The tubular body has a sleeve with a closed end journaled in the lower end thereof and with such sleeve also having a flange on its bottom end for engaging the annular bottom edge of the tubular body. The upper portion of the central bore of such sleeve is threaded to facilitate the reception of a draw rod to effect the upsetting action and thence to receive a threaded screw to facilitate the attachment of a product or structure to the plate member.

DRAWINGS

In the accompanying drawings.

FIG. 5 is a cross sectional view of the fastener taken on line 5—5 of FIG. 4;

FIG. 6 is an exploded view of the blind fastener shown in FIGS. 1-4 positioned onto a structure showing the clearance space between such structure and the fastener prior to an upsetting action (such view as well as FIG. 7 is on an enlarged scale relative to FIGS. 1-5);

FIG. 7 is an enlarged cross sectional view showing the fastener upset in a structure or plate member;

FIG. 8 is an exploded cross sectional view of the blind fastener; and,

FIGS. 9 through 11 show alternative forms of the invention in side elevational view with a portion of the fastener broken away to show the joining of the sleeve to the tubular body of the fastener.

DESCRIPTION

Figure 1:
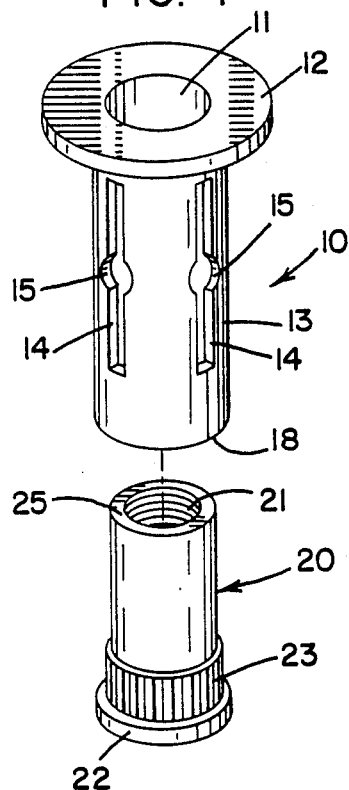
FIG. 1 is an exploded enlarged isometric view of a blind fastener (all views hereinafter are on an enlarged scale relative to the actual size of a fastener)

Referring to the drawings wherein like reference numerals designate like or corresponding parts throughout the several views, there is shown in FIG. 1 a fastener 10 with an upper flat head 12 that is annular in shape and a longitudinally extending cylindrical or tubular body 13 with a central bore 11. Tubular body 13 has a plurality of circumferential spaced longitudinally extending slots 14. The intermediate portion of each slot 14 has an enlarged bore 15 to facilitate the upsetting action of the tubular body in cooperation with the slots 14. The lower internal end portion of the tubular body 13 is counterbored shown in FIGS. 6 and 8 as at 16 presenting an annular edge 18.

Journaled in the tubular body 13 of fastener 10 is a sleeve 20 having an upper portion that is internally threaded as at 21. The lower portion of sleeve 20 is closed and has an outwardly extending annular flange 22 that abuttingly engages the annular edge 18 of tubular body 13.

Figure 2:
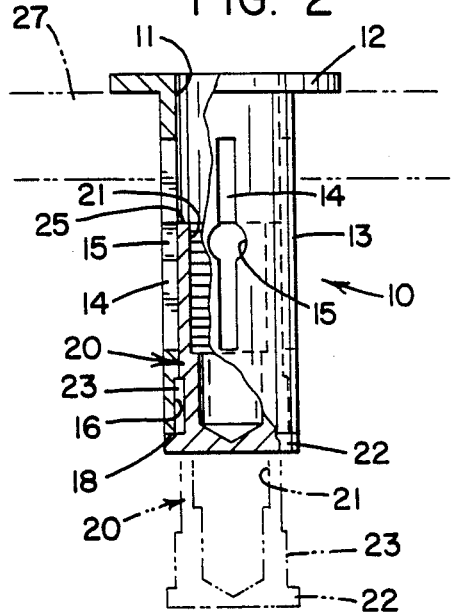
FIG. 2 is a side elevational view of a fastener as shown in FIG. 1 with a portion of the fastener broken away to show the sleeve within the central bore of the fastener and with the lower portion of the sleeve shown in phantom lines during assembly.
Figure 3:
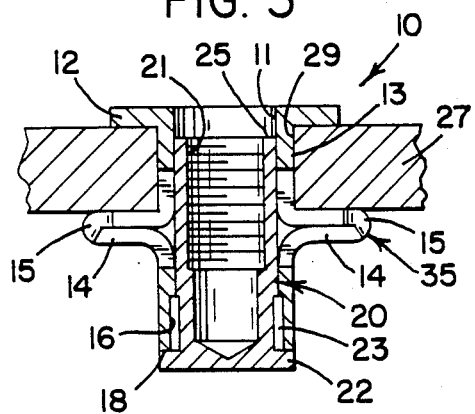
FIG. 3 is a cross sectional view showing the fastener upset in a plate structure with a normal or long reach.
Figure 4:
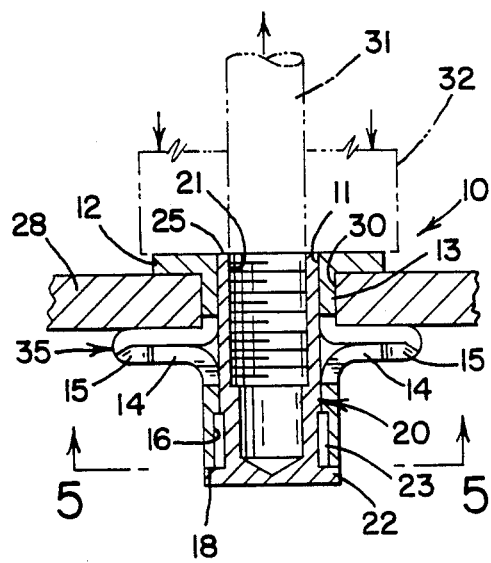
FIG. 4 is a cross sectional view showing the fastener upset in a plate structure with a short reach, showing a portion of the draw rod and anvil in phantom lines which would perform the upsetting action on the fastener.

The wall thickness of the upper portion of sleeve 20 is substantially thinner than the wall thickness of the very lower end portion of such sleeve to facilitate a frictional fit or interference fit for journaling of the sleeve 20 within the tubular body 13. The exterior surface of sleeve 20 adjacent the flanged portion 22 has a knurled portion 23 such that on journaling of the sleeve 20 into tubular body 13, such knurled portion 23 is force fitted into the counterbored portion 16 to provide a positive interconnection or engagement between the sleeve 20 and the tubular body 13. As seen in FIG. 2, once sleeve 20 is fully received by the tubular body 13 the uppermost annular end 25 of the sleeve 20 is slightly below the uppermost end of slots 14, however on upsetting the tubular sleeve 13, such uppermost end 25 is above the uppermost end of slot 14 to assure a full sealing of the fastener (FIG. 4). As to be described, the uppermost portion of end 25 can be slightly below the top surface of the structure in which such fastener is mounted as seen in FIG. 3. This permits the use of the fastener with a plurality of sized structures.

To attach the fastener 10 to a plate structure or member 27 (FIGS. 3, 6 and 7) or plate structure 28 (FIG. 4) hole 29 and 30 respectively are drilled through the structures, which allows the insertion of the fastener 10 into the hole or holes such that the annular shaped head 12 seats on the plate structure. It is to be noted that FIGS. 6 and 7 show the fastener and the clearance spaces in an enlarged size relative to the actual size of the fastener to emphasize the relationship of the parts and to better illustrate the manner in which the fastener and its related parts operate. It is to be further noted that sleeve 20 (0.332 inch outside diameter) is 0.006 inch greater in diameter than the central bore 11 of tubular body 13 which is to receive such sleeve. Hole 29 in plate member 27 has a 0.003 inch clearance space overall between the outside diameter of tubular body 13 and its diameter, such that upon tubular body 13 receiving sleeve 20, sleeve 20 forces a slight expansion of the tubular body 13 to provide an interference fit between the tubular body 13 and the hole 29 as well as an interference fit between the tubular body 13 and the sleeve 20 as seen in FIG. 7. Such interference fit in reacting on the walls of central bore 29, densifies the bore surface as in a burnishing operation to assure a fluid tight fit. It is to be remembered that the tubular body 13 is made from a relatively soft deformable metal in comparison to the sleeve 20 to facilitate the action as described above. A draw rod 31 of an upsetting tool is then threadedly connected to the threaded portion 21 of sleeve 20 of the fastener as illustrated in FIG. 4. A non-rotatable annular anvil 32 is drawn down over the rod 31 and has its lower surface in engagement or bearing against the head 12. As the rod 30 is moved upwardly relative to head 12, pressure is maintained on the anvil 32 so that on continued upward movement of rod 31 will cause the flanged portion 22 of sleeve 20 to buckle the slotted tubular portion forming a bulged portion 35 (FIGS. 3 and 4), which buckled portion 35 in cooperation with the head 12 captively secures the fastener 10 to the structures 27 and 28 as shown by FIGS. 3 and 4 respectively. Such buckling action will cause the longitudinal strips of the tubular body 13 between the respective slots 14 to fold outwardly and as the draw rod 31 is continued to be moved upwardly each strip designated 26 in FIG. 5 will bend until they fold back on each other and the fold is seated firmly against the blind side of the structure. In effect, the folding of strips 26 will be bent 180° and form a shape resembling a flower pedal as seen in FIG. 5. The draw rod is then screwed out of the fastener 10 which is ready to use for holding any desired component to the structure 27. In both examples the upper portion of sleeve 20 moves beyond the slots 14 to seal the fasteners within their structure so that no fluid can escape through the fastener or around the fastener as described above. Thereafter a threaded bolt may be threaded into the threaded sleeve 20 to secure a product to the structures. The only difference between structures 27 and 28 is that structure 27 is thicker than structure 28, illustrating the versatility of the blind fastener 10.

The above embodiment as described is drawn to a fastener made from metal however the above described invention is equally applicable where the tubular body 13 is made from a soft plastic material while sleeve 20 is made of a harder plastic material. The operation and functioning of the elements would be the same.

A further modification of the invention is shown in FIG. 9 wherein all elements and components are the same as those described in the first embodiment except that flange 22' of threaded sleeve 20' of the embodiment of FIG. 8 is spot welded as at 36 to the very lower abutting portion of the tubular body 13. Such welding as at 36 is in lieu of the knurled portion 23 of the first embodiment, otherwise such fastener is installed the same way. The weld 36 may be a plurality of spot welds around the circumference of the tubular body 13 or by a single weld that extends around the entire circumference.

Another modifications of the invention is shown in FIG. 10 wherein all elements and components are the same as those of the first embodiment except that the tubular body 13 is secured to the sleeve 40 at the very lower portion of tubular body 13 by deforming as at 41 such body 13 closely adjacent to the flange 22 to firmly secure the sleeve 40 to tubular body 13. Such deformation a 41 may be a plurality of deformations around the circumference of the tubular body 13.

A further modification of the invention is shown in FIG. 11 wherein all elements and components are the same as those described in the first embodiment except that in lieu of the knurling of the lower portion of sleeve 20, modified sleeve 20'' adjacent the flange 22'' is filled with an epoxy resin mixture 45 to interconnect sleeve 20'' and the tubular body 13 at recess 16 to form a bonding relationship therebetween.

It will be apparent that, although a specific embodiment and certain modifications of the invention have been described in detail, the invention is not limited to the specifically illustrated and described constructions since variations may be made without departing from the principles of the invention.

I claim:

1. A blind fastener having a head and tubular body which is integral with said head, said tubular body having a thin walled portion along its length to facilitate the outward protrusion as by an upsetting action to engage the blind surface to which such fastener is attached, the end portion of said tubular body remote from said head having an annular edge, a sleeve frictionally journaled in said tubular body, said sleeve having an internal upper threaded portion, said upper portion of said sleeve having an upper edge that is substantially below said head of said fastener, the outside diameter of said sleeve being slightly greater diameter than inside diameter of upper portion of said tubular body to provide an interference fit between said upper portion of said tubular body and said upper portion of said sleeve upon upsetting of said tubular body as said sleeve moves into interference fitting with said upper portion of said tubular body, said sleeve having a closed lower end portion, said end portion having a flange abuttingly engaging said annular edge to facilitate the upsetting of said tubular body, and the lower end portion of said sleeve secured to the lower end portion of said tubular body.

2. A blind fastener as set forth in claim 1 wherein said sleeve has its lower end portion force fitted circumferentially within said tubular body to provide a fluid tight sealed interconnection therebetween.

3. A blind fastener as set forth in claim 2 wherein said lower end portion of said sleeve is knurled to provide said interconnection to said sleeve.

4. A blind fastener as set forth in claim 1 wherein said tubular body has a plurality of slots along said thin walled portion, and said upper portion of said sleeve movable above said slots upon upsetting of said tubular body.

* * * * *